(12) United States Patent
Williams

(10) Patent No.: US 12,185,671 B2
(45) Date of Patent: Jan. 7, 2025

(54) BALING APPARATUS

(71) Applicant: AGCO Corporation, Duluth, GA (US)

(72) Inventor: Nicholas H. Williams, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 850 days.

(21) Appl. No.: 17/138,671

(22) Filed: Dec. 30, 2020

(65) Prior Publication Data

US 2021/0195842 A1 Jul. 1, 2021

Related U.S. Application Data

(60) Provisional application No. 62/955,680, filed on Dec. 31, 2019.

(51) Int. Cl.
| | | |
|---|---|---|
| *A01F 15/08* | (2006.01) | |
| *B30B 9/30* | (2006.01) | |
| *F16H 3/32* | (2006.01) | |
| *F16H 15/04* | (2006.01) | |
| *A01F 15/04* | (2006.01) | |

(52) U.S. Cl.
CPC ........ *A01F 15/0841* (2013.01); *B30B 9/3007* (2013.01); *B30B 9/306* (2013.01); *F16H 3/32* (2013.01); *A01F 15/04* (2013.01)

(58) Field of Classification Search
CPC ........ A01F 15/0841; A01F 15/04; B30B 9/30; B30B 9/306; B30B 9/3007; F16H 3/32
See application file for complete search history.

(56) References Cited

U.S. PATENT DOCUMENTS

| | | | | |
|---|---|---|---|---|
| 5,894,718 | A | * | 4/1999 | Hawlas ............... A01F 15/0841 100/88 |
| 6,327,926 | B1 | * | 12/2001 | Chilman ............... F16D 41/073 280/236 |
| 2016/0081258 | A1 | * | 3/2016 | Bonte .................. A01B 61/025 74/15.4 |

(Continued)

FOREIGN PATENT DOCUMENTS

| | | |
|---|---|---|
| EP | 0 819 374 A1 | 1/1998 |
| EP | 2 901 845 A1 | 8/2015 |

(Continued)

OTHER PUBLICATIONS

UK Intellectual Propety Office, Search Report for related UK Application No. GB2000413.1, dated Jul. 2, 2020.

(Continued)

*Primary Examiner* — Matthew Katcoff
*Assistant Examiner* — Mohammed S. Alawadi

(57) ABSTRACT

A baler including a flywheel driven by a PTO of a tractor, an input shaft which connects to the PTO, an output shaft which connects to the flywheel, an intermediate gear mounted for rotation between the input shaft and the output shaft, the intermediate gear being parallel to the input shaft and adapted to drive the output shaft, wherein the input shaft includes a displaceable geared collar adapted to engage the intermediate gear with either a first lower gear ratio or a second higher gear ratio. This allows the tractor PTO a lower ratio (speed) range to start the flywheel and then accelerate the flywheel to an intermediate speed before shifting and accelerating to the final desired operating speed.

7 Claims, 9 Drawing Sheets

(56) References Cited

U.S. PATENT DOCUMENTS

2021/0259156 A1* 8/2021 Bonte ................ A01F 15/04

FOREIGN PATENT DOCUMENTS

| EP | 3 398 427 A1 | 11/2018 |
| GB | 1214620 A | 12/1970 |
| WO | 2017/116913 A1 | 7/2017 |
| WO | 2019/180040 A1 | 9/2019 |
| WO | 2020/089306 A1 | 5/2020 |

OTHER PUBLICATIONS

European Patent Office, Search Report for related European Application No. 20214896.1, dated May 27, 2021.

* cited by examiner

BALING APPARATUS

CROSS REFERENCE TO RELATED APPLICATION

This application claims the benefit of U.S. Provisional Application No. 62/955,680, filed Dec. 31, 2019, which is hereby incorporated by reference in its entirety.

BACKGROUND

Field

The present invention relates to a baling apparatus and in particular to a baling apparatus for producing square bales.

Description of Related Art

It is known to construct a baling apparatus for square bales in which a plunger reciprocates in a baling chamber. As crop material is introduced into the baling chamber, the plunger slides into the baling chamber to compress the crop material into a bale. The plunger is typically driven by a Power Take Off (PTO) system of a towing vehicle, such as a tractor, while the tractor is driven along a field.

In practice large square balers use a flywheel having a high inertial mass to store and release energy during the above cyclic loading cycle of the baling operation. Generally flywheels have become larger in size over time in order to achieve increased efficiency and greater bale density. Conversely, flywheels are limited in size, due to the ability to, means or process for accelerating the flywheel to a desired operating speed. Principal limitations include the available engine power of the towing tractor and the PTO clutch capacity of the towing tractor.

SUMMARY

According to a first aspect of the present invention, a baler comprises a flywheel connected by a cardan coupling to a connector to be connected to a PTO of a tractor, so that the flywheel may be driven by the PTO, in which the connector comprises:
  a housing;
  an input shaft to be connected to the PTO mounted for rotation in a first part of the housing;
  an output shaft to be connected to the cardan coupling, the output shaft being mounted for rotation in a second part of the housing;
  an intermediate gear being mounted for rotation in the housing between the input shaft and the output shaft, the intermediate gear being disposed parallel to the input shaft and adapted to drive the output shaft;
  wherein the input shaft is provided with a displaceable geared collar adapted to engage the intermediate gear with either a first lower gear ratio or a second higher gear ratio.

This has as an advantage that it allows the improving of the mechanical advantage at the tractor PTO through the addition of a lower ratio (speed) range required to start the flywheel and then accelerate the flywheel to an intermediate speed before shifting and accelerating to the final desired operating speed.

Preferably the intermediate gear comprises a gear cluster. Preferably the displaceable geared collar comprises a gear cluster.

Preferably the connector further comprises an axial shift mechanism to move the displaceable geared collar with respect to the input shaft.

Preferably, the displaceable geared collar is biased to engage the lower gear ratio.

Preferably the output shaft is connected to the cardan coupling by way of a directional clutch.

According to a second aspect of the invention, a method of initiating a baler in accordance with the first aspect of the invention comprises the steps of:
  initiating the PTO with the displaceable geared collar adapted to engage the intermediate gear with the first lower gear ratio;
  detecting when the flywheel has attained a desired initial velocity;
  switching off the PTO;
  operating the actuator to cause the displaceable geared collar to engage the intermediate gear with the higher gear ratio; and
  re-engaging the PTO.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
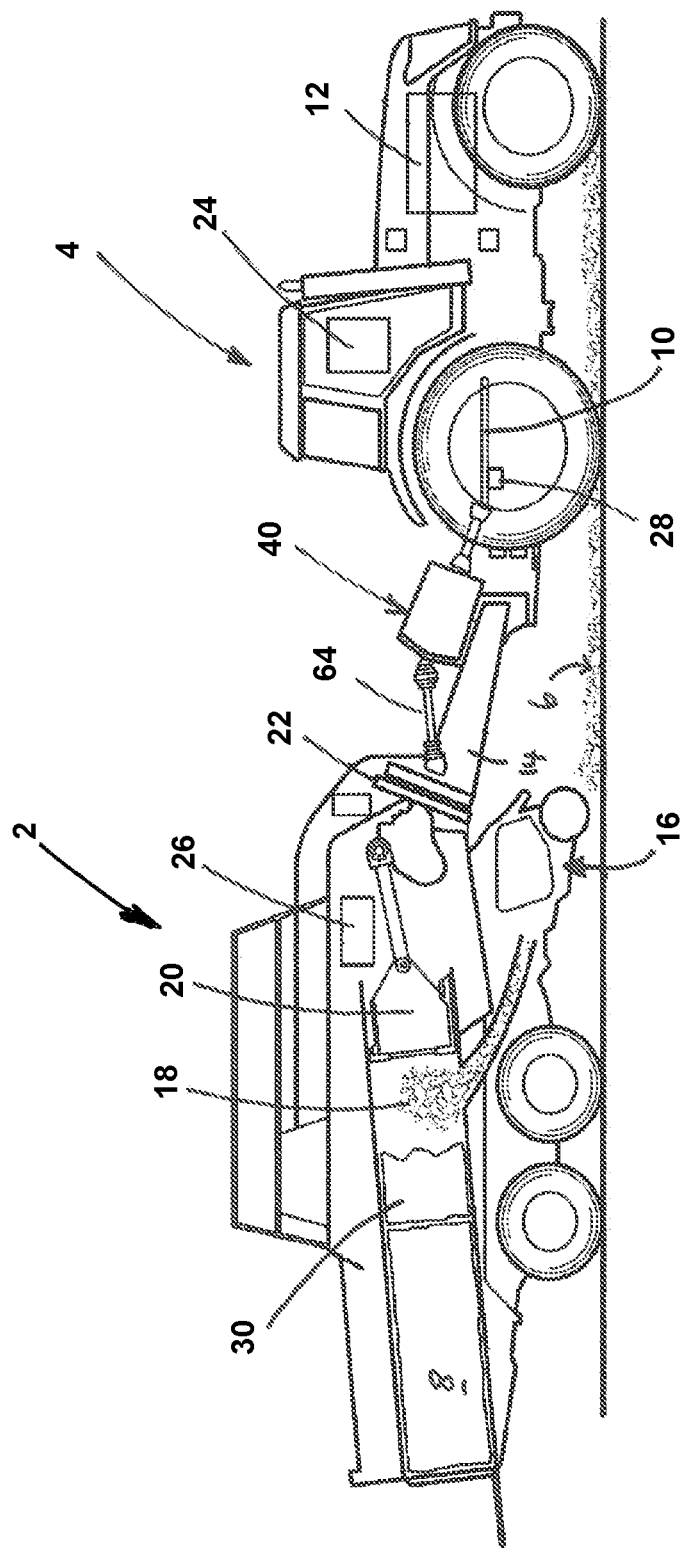
FIG. 1 shows a schematic side view of an agricultural vehicle connected to an agricultural implement in the form of a baler by a connector in accordance with the present invention.
Figure 2:
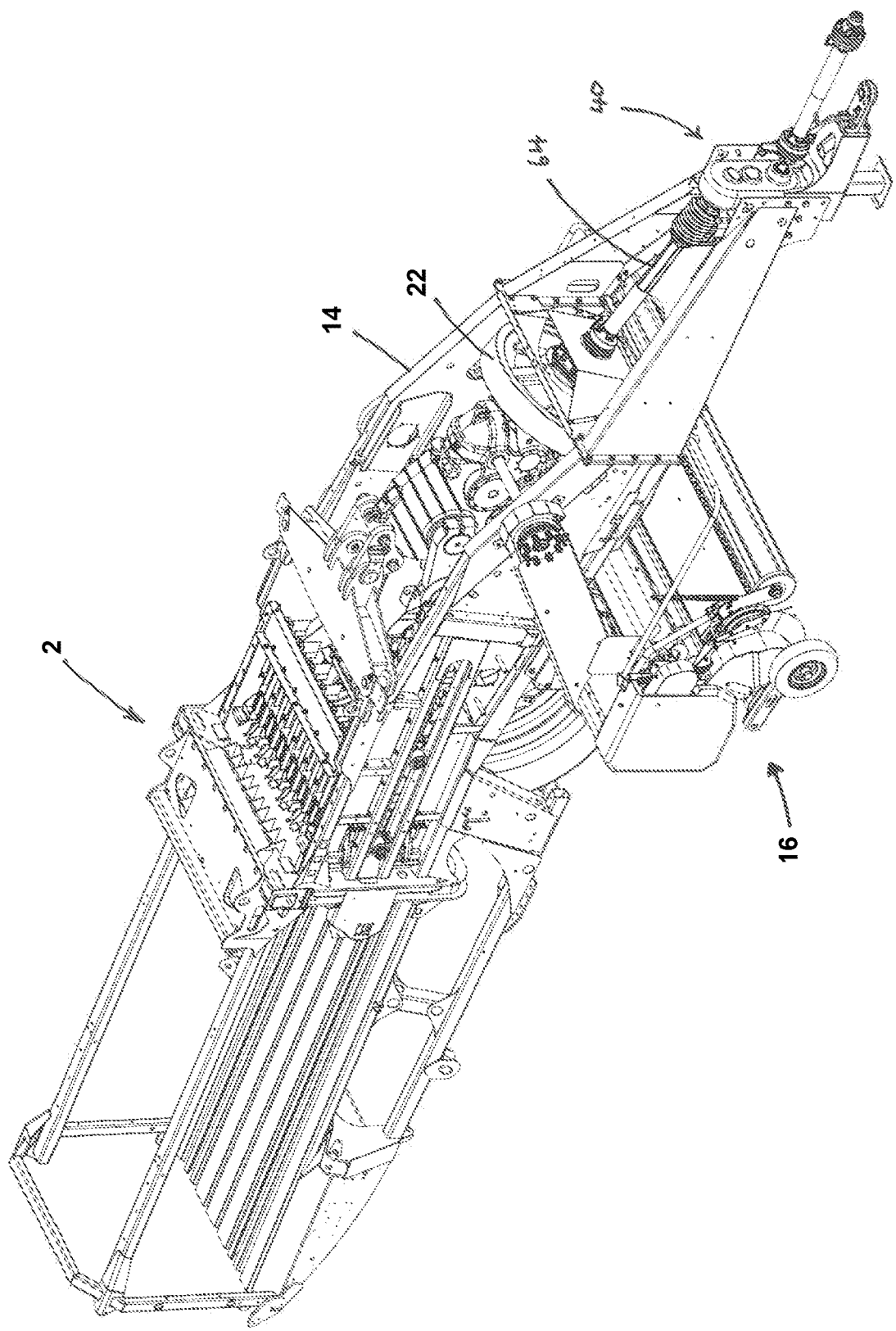
FIG. 2 is a perspective view of a baler in accordance with the present invention.
Figure 3:
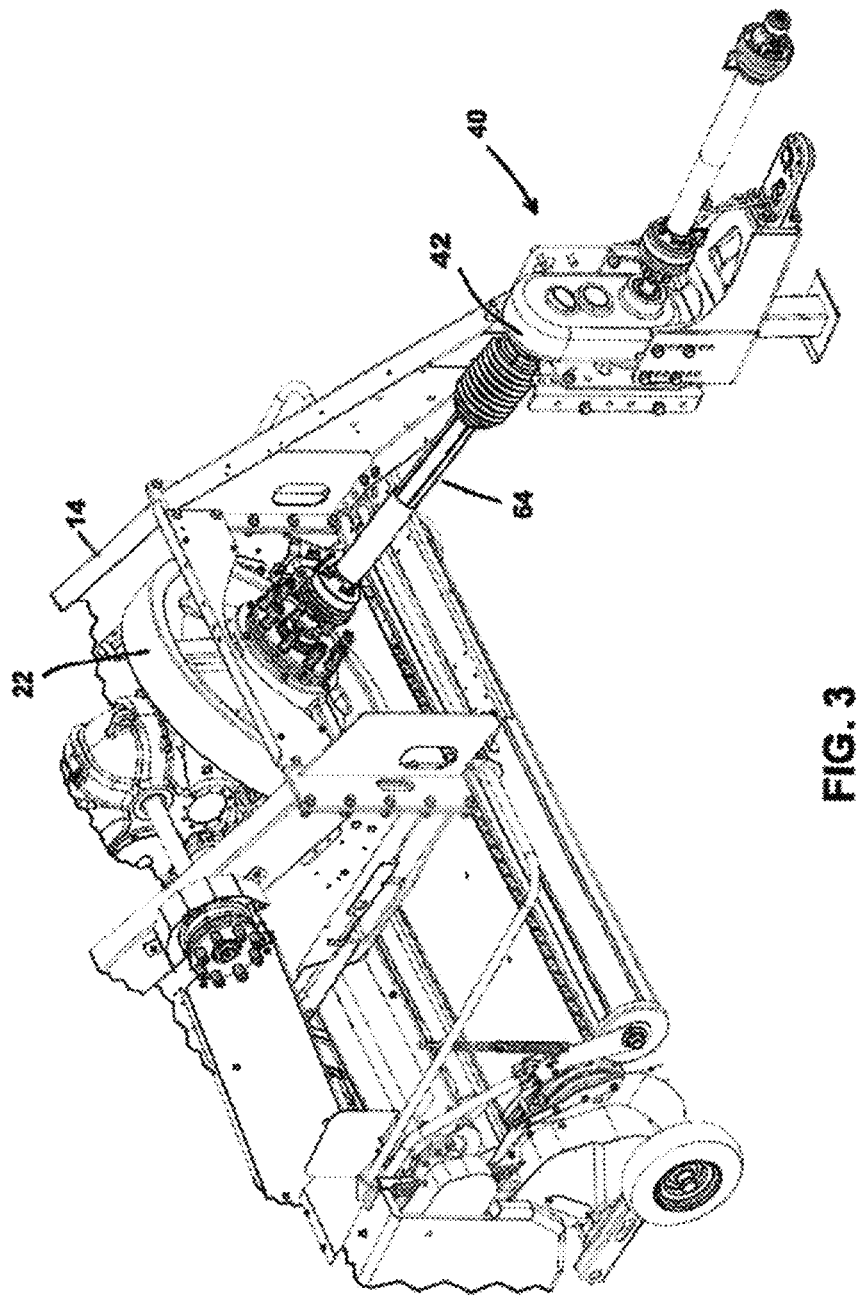
FIG. 3 is an enlargement of a detail of FIG. 2.

With reference to FIG. 1, a schematic side view of an agricultural vehicle connected to an agricultural implement by a connector in accordance with the present invention is shown. Reference should also be made to FIGS. 2 and 3. A baler 2 is, in use, towed by an agricultural vehicle 4 such as a tractor. As it is towed, the baler 2 is operable to receive loose crop material 6 and to form the conveyed crop material into a substantially rectangular bale 8. The agricultural vehicle 4 is provided with a Power Take Off (or PTO) 10 operable to transfer mechanical power from an engine 12 of the agricultural vehicle 4 to the baler 2. The baler 2 comprises a frame 14 mechanically coupled with the agricultural vehicle 4, a loose crop material receiving component 16, a forming or baling chamber 18, a plunger 20, a crankshaft, a fly wheel 22, a communication bus 24 extending between the agricultural vehicle 4 and the baler 2 and an electronic control unit 26. Additionally one or more PTO sensors 28 and/or one or more plunger sensors may be provided.

The loose crop material receiving component 16 may take any suitable form and include a pick up mechanism to pick up the loose crop material from the ground, a cutter mechanism to cut the loose crop material and a feeder or conveyor unit to direct the loose crop material into a stuffer chute connected to the baling chamber 18. The baling chamber 18 is conveniently operable to receive the loose material from the stuffer chute and hold the loose crop material 6 as it is compressed by the plunger 20 into a growing bale 30. The baling chamber 18 is conveniently rectangular to facilitate the compression and forming process.

The plunger 20 is operated to compress the loose crop material 6 as a result of a reciprocating movement within the baling chamber 18. Forward movement of the plunger 20 compresses loose crop material present in the baling chamber 18 and retraction allows further loose crop material to enter the baling chamber 18 by way of the stuffer chute. A connecting rod 32 may connect the plunger 20 to the crankshaft. In turn the crankshaft is mechanically coupled to and operable to store and transfer power from the PTO 10 to the plunger 20. Typically the flywheel 22 is operable to store and release kinetic energy from the PTO in order to provide a greater inertial mass to smooth the operation of the plunger 20.

The communication bus 24 is operable to communicate bi-directionally between the agricultural vehicle 4 and the baler 2. The electronic control unit 26 may be operable to receive signals from sensors, such as the PTO and plunger sensors, and to send signals to control various elements of the baler 2.

A connection 40 between the PTO 10 and the flywheel 22 will now be described with particular reference to FIGS. 4 to 9. The connection 40 comprises a housing 42, an input shaft 44 provided with a displaceable geared collar 46, an output shaft 48 and an intermediate shaft 50.

The input shaft 44 is connected to the PTO 10 to be rotatably driven in use by the PTO 10. The displaceable geared collar 46 is mounted about the input shaft 44. The displaceable geared collar 46 is provided with individual first and second gears 52,54. In the illustrated embodiment, the displaceable geared collar 46 is splined for lateral movement with respect to the input shaft 44.

The displaceable geared collar 46 may be induced to move axially with respect to the input shaft 44 by an actuator. The actuator may be electric or hydraulic. A biasing element such as a spring acts on the displaceable geared collar 46 to maintain the displaceable geared collar 46 in the position shown in FIG. 5. The actuator is adapted to overcome the biasing element to move the displaceable geared collar 46 into the position shown in FIG. 8.

The intermediate shaft 50 conveniently takes the form of a cluster gear with first and second gears 56,58 of different sizes.

The output shaft 48 is provided with a gear 60 at a first end within the housing 40. A second end of the output shaft 48 is connected by way of a directional clutch 62 to a first end of a cardan joint driveshaft 64. The directional clutch 62 aids the shifting of the displaceable geared collar 46 by allowing the shafts internal to the gearbox internal to the gearbox to remain stationary (that is, without rotation) via the application of the PTO brake of the agricultural vehicle while the cardan joint driveshaft 64 and all other baler drive components rotate. This eliminates the need for synchronizers and clutches since the shift operation is performed on a static geartrain. A second end of the driveshaft 64 is connected to the flywheel 22.

It will be understood that the ratio of the second gears 54, 58 of the geared collar and gear cluster is chosen to provide for a lower ratio gear pair than that provided by the first gears 52, 56 of the geared collar and gear cluster.

Figure 5:
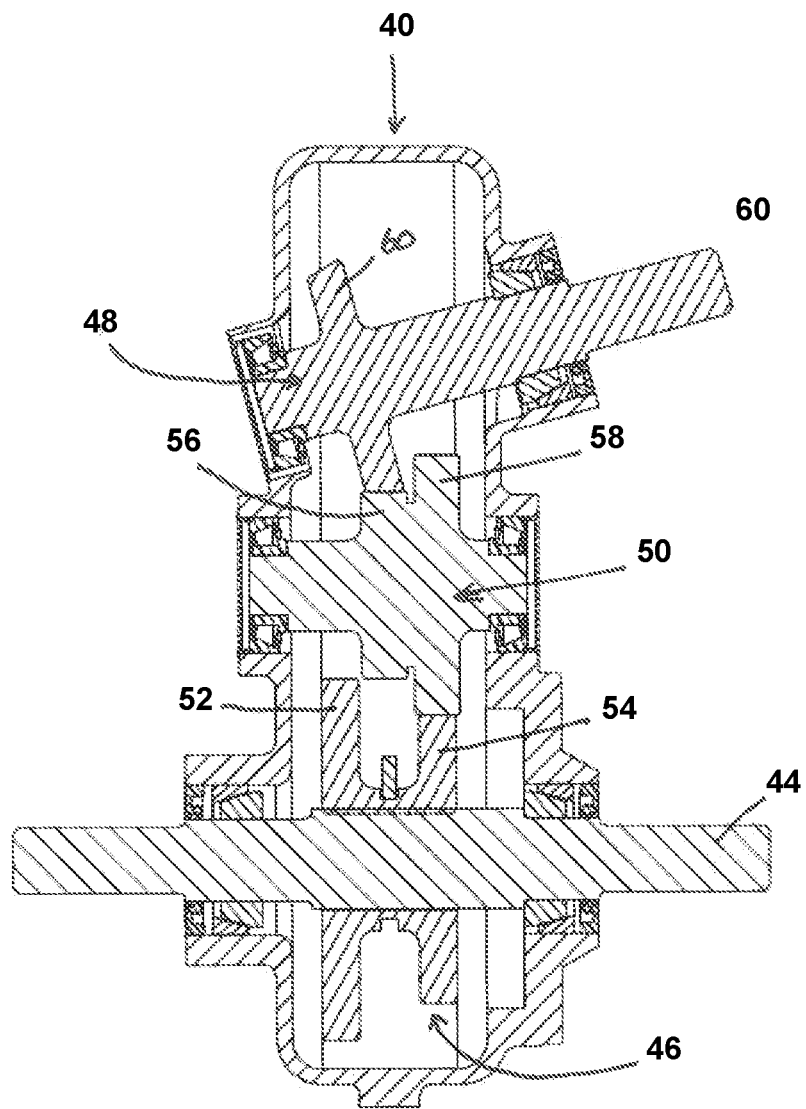
FIG. 5 shows a schematic side section of the connector in which the connector elements are arranged in a low ratio position.
Figure 6:
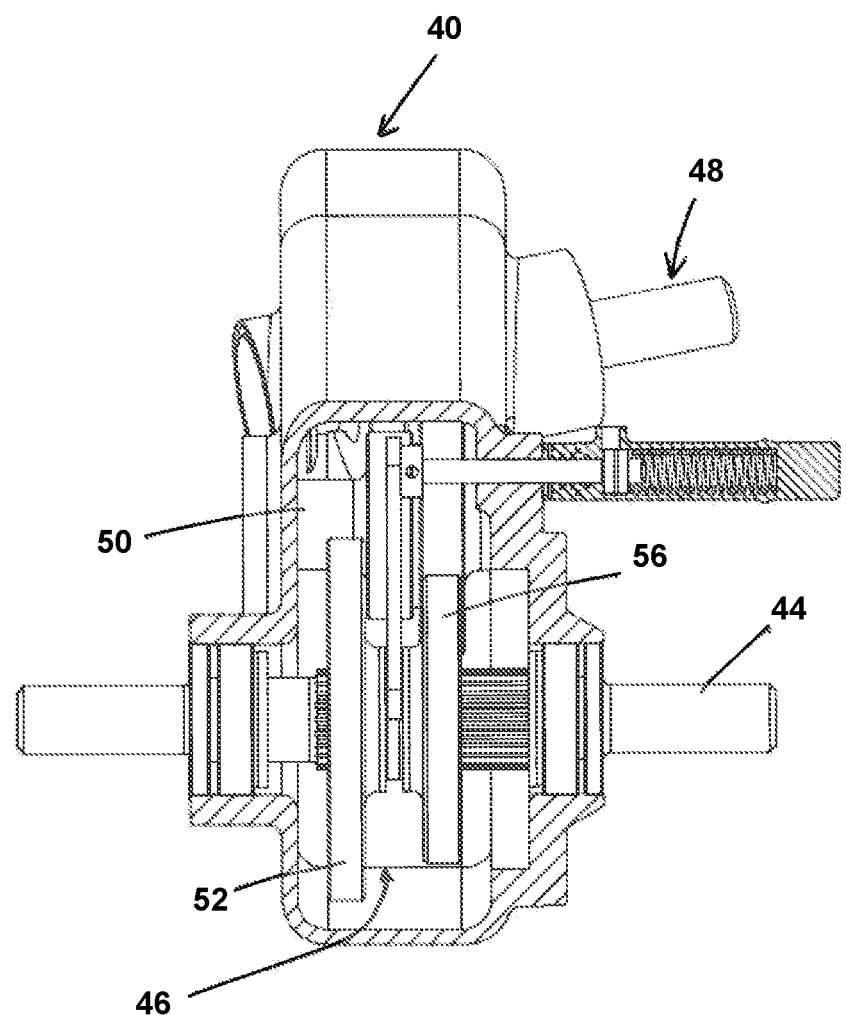
FIG. 6 shows a part sectional view through a portion of the connector.
Figure 7:
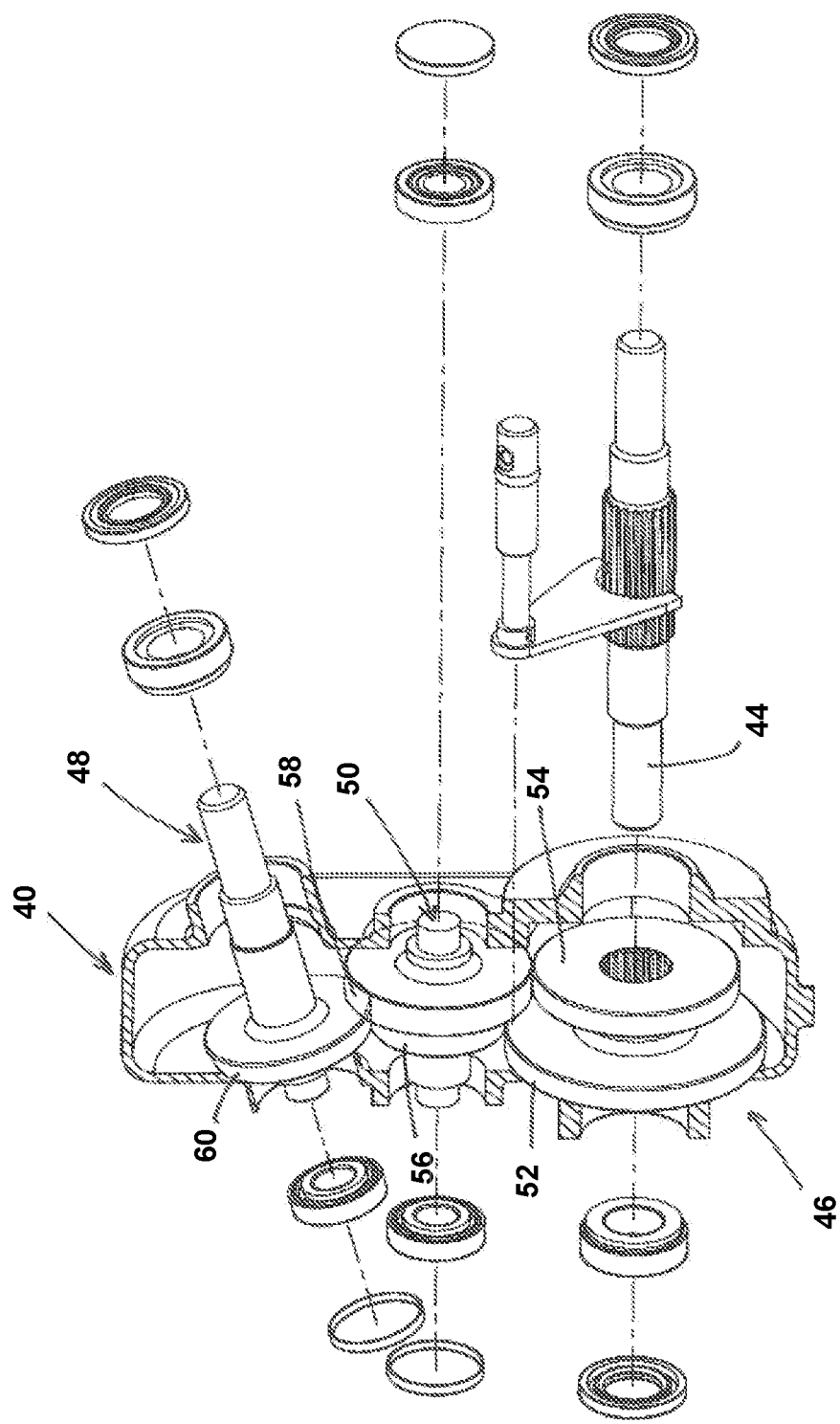
FIG. 7 shows an exploded view of a portion of the connector.

In operation, the connector elements initially adopt the position shown in FIGS. 5 to 7, that is a low ratio position. This allows for a large mechanical advantage between the PTO 10 and the flywheel 22 on start up. On start-up, the PTO 10 is engaged, and once the tractor engine 12 has recovered from the initial engagement, and the flywheel 22 has attained a desired initial velocity, the PTO 10 is then switched off. The electronic control unit 26 may be provided with signals from sensors to confirm that the desired condition has been achieved and so signal the PTO 10 to switch off. The PTO brake on the tractor is applied thereby causing the input shaft 44 to stop while the directional clutch 62 allows the baler flywheel 22 to continue rotating.

Figure 4:
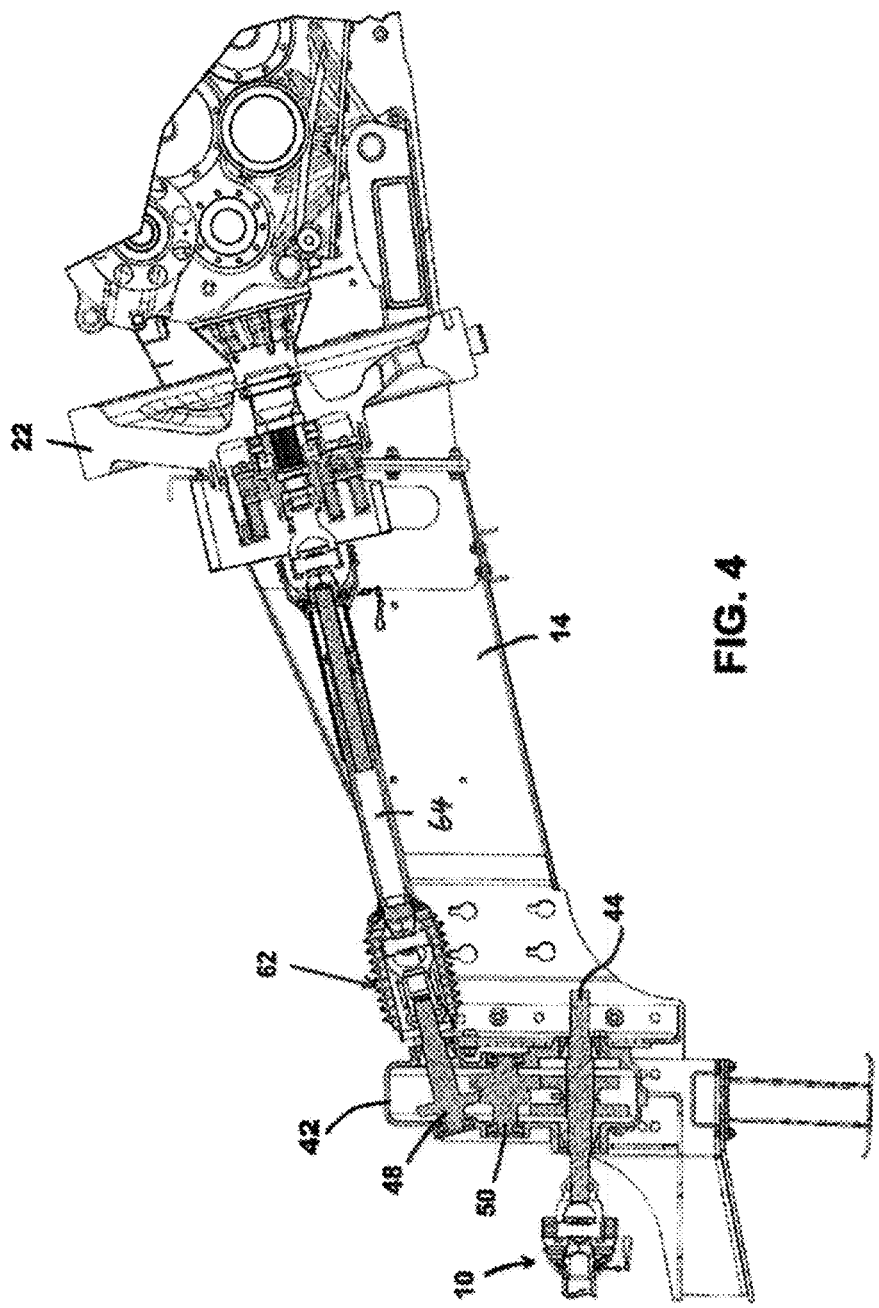
FIG. 4 shows a side section through a portion of the baler and a portion of the PTO mechanism of the agricultural vehicle in which the connector elements are shown in a high ratio position.
Figure 8:
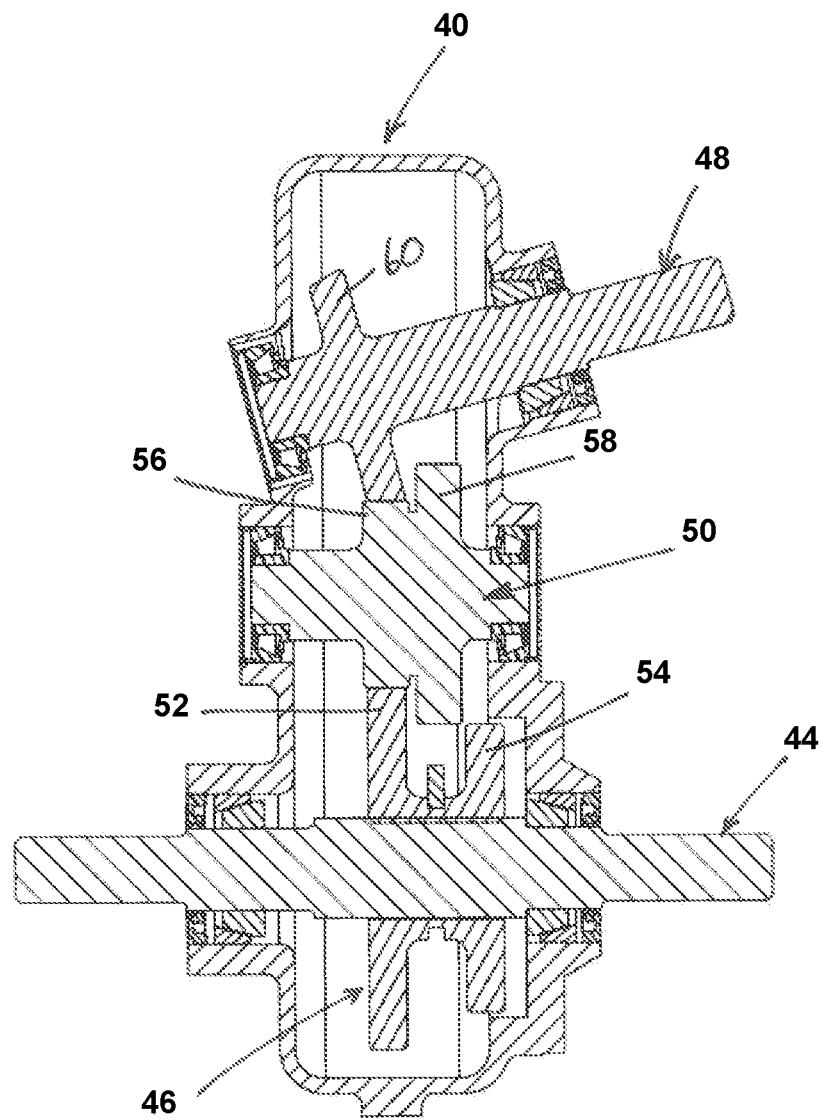
FIG. 8 shows a schematic side section similar to FIG. 5 illustrating the connector elements arranged in the high ratio position.
Figure 9:
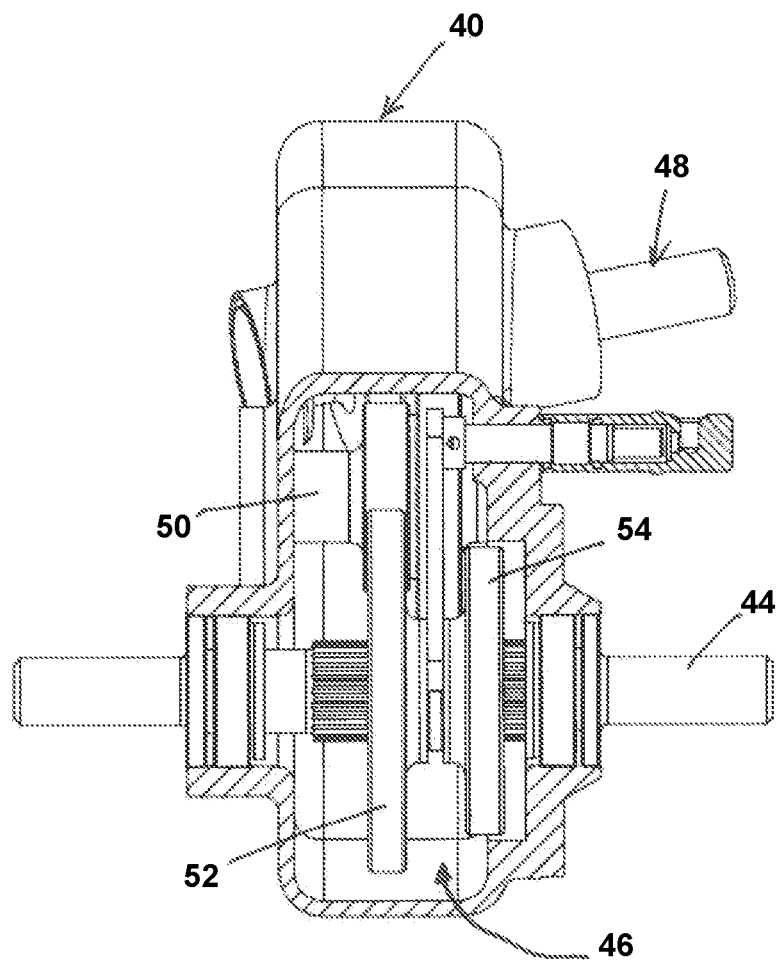
FIG. 9 shows a part sectional view through a portion of the connector.

The actuator is then signalled and operated to cause the displaceable geared collar 46 to be moved to a high ratio position shown in FIGS. 4, 8 and 9. Once the displaceable geared collar 46 is in this position, a signal is sent to engage the PTO clutch on the tractor 4 and the baler flywheel 22 is then driven and accelerated to full operational speed.

It will be understood that the use of different gears in producing the desired gear ratios results in less wear of the PTO clutch involved in comparison to a use of single gear ratio. Further, use of a lower initial gear ratio than would be desirable in using a fixed gear ratio, enables an easier start to the baler mechanism and so less wear on the PTO clutch.

In an alternative embodiment (not shown) the input shaft may be provided with a fixed gear arrangement and the intermediate shaft provided with an axially displaceable geared collar. In a further embodiment, not shown, the actuator is adapted to displace the clustered gear collar.

From reading the present disclosure, other modifications will be apparent to persons skilled in the art. Such modifications may involve other features which are already known in the field of square balers and component parts therefore and which may be used instead of or in addition to features already described herein.

The invention claimed is:

1. A baler comprising a flywheel connected by a cardan coupling to a connector to be connected to a PTO of a tractor, so that the flywheel may be driven by the PTO, in which the connector comprises:
   a housing;
   an input shaft to be connected to the PTO, the input shaft being mounted for rotation in a first part of the housing;

an output shaft to be connected to the cardan coupling, the output shaft being mounted for rotation in a second part of the housing;

an intermediate gear being mounted for rotation in the housing between the input shaft and the output shaft, the intermediate gear being disposed parallel to the input shaft and adapted to drive the output shaft; and wherein the input shaft comprises a displaceable geared collar co-axially aligned on the input shaft so as to move axially with respect to the input shaft and adapted to engage the intermediate gear with either a first lower gear ratio or a second higher gear ratio.

2. The baler according to claim 1, in which the intermediate gear comprises a first gear cluster.

3. The baler according to claim 2, in which the displaceable geared collar comprises a second gear cluster.

4. The baler according to claim 1, in which the connector further comprises an axial shift mechanism to shift the displaceable geared collar with respect to the input shaft.

5. The baler according to claim 4, in which the axial shift mechanism comprises an electrical or hydraulic actuator.

6. The baler according to claim 1, in which the output shaft is connected to the cardan coupling by way of a directional clutch.

7. A method of initiating the baler of claim 1, the method comprising:
   initiating the PTO with the displaceable geared collar adapted to engage the intermediate gear with the first lower gear ratio;
   detecting when the flywheel has attained a desired initial velocity;
   switching off the PTO;
   moving the displaceable geared collar axially with respect to the input shaft to engage the intermediate gear with the higher gear ratio; and
   re-engaging the PTO.

* * * * *